United States Patent
Busler et al.

(10) Patent No.: US 10,549,390 B2
(45) Date of Patent: Feb. 4, 2020

(54) BODY COMPONENT HAVING A TAB ELEMENT FOR PRE-FASTENING

(71) Applicant: Bayerische Motoren Werke Aktiengesellschaft, Munich (DE)

(72) Inventors: Stephan Busler, Ruhstorf (DE); Franz Pfeffer, Rinchnach (DE); Johannes Walch, Neufahrn (DE); Josef Bachner, Mainburg (DE); Christian Boeer, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 63 days.

(21) Appl. No.: 15/937,532

(22) Filed: Mar. 27, 2018

(65) Prior Publication Data

US 2018/0214994 A1   Aug. 2, 2018

Related U.S. Application Data

(63) Continuation of application No. PCT/EP2016/071432, filed on Sep. 12, 2016.

(30) Foreign Application Priority Data

Sep. 30, 2015   (DE) .......................... 10 2015 218 817

(51) Int. Cl.
*B62D 27/00* (2006.01)
*B23K 37/047* (2006.01)
(Continued)

(52) U.S. Cl.
CPC ............ *B23K 37/047* (2013.01); *B62D 65/02* (2013.01); *F16B 5/0614* (2013.01); *F16B 5/0664* (2013.01)

(58) Field of Classification Search
CPC ......... H01L 2924/00; H01L 2924/0002; H01L 2924/00014; H01L 2924/14; H01L 2224/45144; B29C 66/71; E04D 2001/005
See application file for complete search history.

(56) References Cited

U.S. PATENT DOCUMENTS 3,702,386 A * 11/1972 Foerstner ................. H05B 6/64
                                                    219/746
4,564,111 A *  1/1986 Suttles ................. A47B 47/024
                                                    108/187
(Continued)

FOREIGN PATENT DOCUMENTS

CN      201366994 Y    12/2009
CN      102929018 A     2/2013
(Continued)

OTHER PUBLICATIONS

German Search Report issued in counterpart German Application No. 10 2015 218 817.5 dated Jun. 2, 2016 with English translation (Eleven (11) pages).

(Continued)

*Primary Examiner* — Kiran B Patel
(74) *Attorney, Agent, or Firm* — Crowell & Moring LLP

(57) ABSTRACT

A body component has a side edge, which extends in a longitudinal direction and on which at least one pre-fastening device is formed. The pre-fastening device has a section that protrudes from the side edge in a transverse direction, on which section a tab pointing toward the side edge is formed. The tab can be bent in a vertical direction perpendicular to the longitudinal direction and is configured to be able to engage behind a frame edge of a vehicle frame part in a pre-fastening manner.

14 Claims, 1 Drawing Sheet

(51) Int. Cl.
   *B62D 65/02* (2006.01)
   *F16B 5/06* (2006.01)

(56) References Cited

U.S. PATENT DOCUMENTS

| | | | | |
|---|---|---|---|---|
| 4,593,965 A * | 6/1986 | Joly | ........................ | H01R 33/72 |
| | | | | 439/346 |
| 4,817,861 A * | 4/1989 | Henrikson | ................ | B42F 7/14 |
| | | | | 206/425 |
| 4,883,222 A * | 11/1989 | Fujisawa | ................ | B65D 5/068 |
| | | | | 229/160.2 |
| 4,911,685 A * | 3/1990 | Hucks | .................... | B65D 65/14 |
| | | | | 229/87.2 |
| 4,919,785 A * | 4/1990 | Willey | .................. | B65D 5/5455 |
| | | | | 229/188 |
| 5,199,156 A | 4/1993 | Rossi | | |
| 5,207,375 A * | 5/1993 | McClure | ................. | B65D 5/22 |
| | | | | 229/149 |
| 5,213,256 A * | 5/1993 | Cyr | ........................ | B65D 25/08 |
| | | | | 229/120.32 |
| 5,249,082 A * | 9/1993 | Newman | ................ | G02B 7/028 |
| | | | | 359/813 |
| 5,328,080 A * | 7/1994 | Holley, Jr. | ........... | B65D 5/4279 |
| | | | | 206/140 |
| 6,135,666 A | 10/2000 | Kelly et al. | | |
| 6,499,783 B1 * | 12/2002 | Husted | ....................... | B60P 3/04 |
| | | | | 119/405 |
| 7,207,617 B2 * | 4/2007 | Pelini | .................... | B62D 25/08 |
| | | | | 293/120 |
| 7,390,052 B2 * | 6/2008 | Bertoch | ................ | B62D 21/20 |
| | | | | 296/156 |
| 7,488,032 B2 * | 2/2009 | Thakar | ................. | B62D 25/161 |
| | | | | 296/191 |
| 7,726,717 B2 * | 6/2010 | Onuma | ............... | B05B 13/0292 |
| | | | | 296/1.08 |
| 7,770,955 B2 * | 8/2010 | Kleber | ................. | B21D 39/021 |
| | | | | 29/243.58 |
| 8,042,852 B2 * | 10/2011 | Onuma | ............... | B05B 13/0292 |
| | | | | 296/1.08 |
| 8,087,721 B2 * | 1/2012 | Kralevich | ............... | B60R 21/34 |
| | | | | 296/191 |
| 8,443,923 B2 * | 5/2013 | Brosz | ................. | B62D 33/0604 |
| | | | | 180/89.1 |
| 8,490,358 B2 * | 7/2013 | Bowers | ................. | F16B 5/0635 |
| | | | | 52/582.1 |
| 9,487,244 B2 * | 11/2016 | Elfwing | ................. | B23K 11/11 |
| 10,202,149 B1 * | 2/2019 | Johnson | ................ | B62D 21/02 |
| 2002/0158484 A1 * | 10/2002 | Delavalle | ............ | B62D 29/048 |
| | | | | 296/29 |
| 2002/0163216 A1 * | 11/2002 | Delavalle | ............. | B62D 25/163 |
| | | | | 296/29 |
| 2012/0297584 A1 | 11/2012 | Lin | | |
| 2016/0153483 A1 | 6/2016 | Berthold | | |
| 2017/0048997 A1 * | 2/2017 | Morin | ............... | H01R 13/6596 |

FOREIGN PATENT DOCUMENTS

| | | |
|---|---|---|
| CN | 203926259 U | 11/2014 |
| CN | 204368288 U | 6/2015 |
| CN | 105452682 A | 3/2016 |
| DE | 10 2009 048 168 A1 | 5/2010 |
| EP | 0 147 910 A2 | 7/1985 |

OTHER PUBLICATIONS

International Search Report (PCT/ISA/210) issued in PCT Application No. PCT/JP2016/071432 dated Nov. 29, 2016 with English translation (four (4) pages).

Chinese-language Office Action issued in counterpart Chinese Application No. 201680037478.9 dated Nov. 22, 2018 with English translation (11 pages).

\* cited by examiner

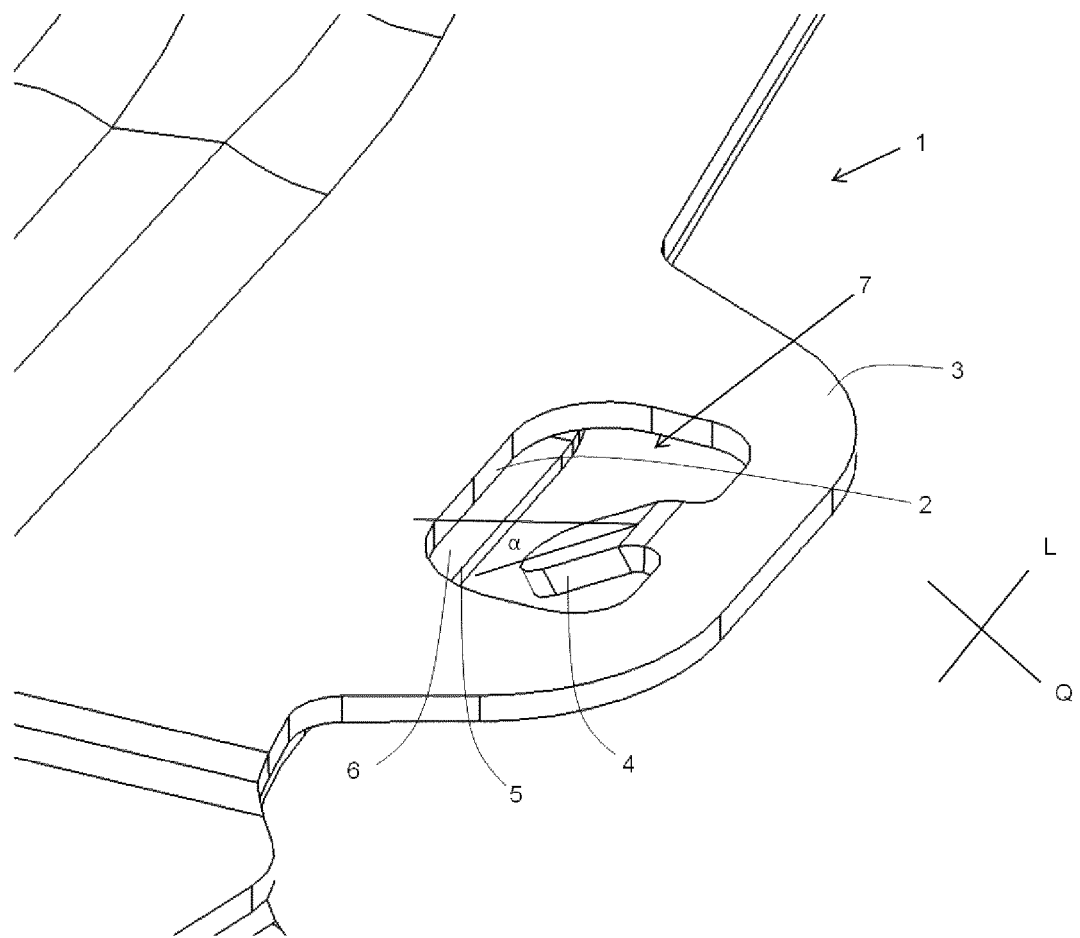

BODY COMPONENT HAVING A TAB ELEMENT FOR PRE-FASTENING

CROSS REFERENCE TO RELATED APPLICATIONS

This application is a continuation of PCT International Application No. PCT/EP2016/071432, filed Sep. 12, 2016, which claims priority under 35 U.S.C. § 119 from German Patent Application No. 10 2015 218 817.5, filed Sep. 30, 2015, the entire disclosures of which are herein expressly incorporated by reference.

BACKGROUND AND SUMMARY OF THE INVENTION

The invention relates to a body component having a pre-fastening device which is formed on the side edge thereof and via which the body component can be pre-fastened to a vehicle frame.

It is known in automobile manufacturing to pre-fasten body components to vehicle frame parts, for example the floor assembly, in an intermediate state of the body shell. For this purpose, use is made of what are referred to as tab elements which pre-position and fasten the assemblies to the state of the body shell constructed up to this point before the welding station. If the components which are to be pre-fastened have been brought into the desired contact position, they are fastened to one another in a separate station by the tab elements by the tabs which are formed on the one component being bent by 60-180° and about the edge of the adjacent component.

The tab elements engage here around the edge and hold the components in position. Since tab elements can be provided on all sides, a relative movement of the components with respect to one another can be prevented in all directions.

Variants of the tab element with an "S" curve are also possible. An "S curve" means that the tab element is bent twice in order to be guided through an opening on the component to be fastened (first bend) and subsequently to be brought into contact with the component (second bend in the opposite direction). In this variant, preceding bending operations of 90° or −90° are required.

It is basically disadvantageous that, in the case of materials of higher and maximum strength, especially heat-formed steels, and also in the case of high sheet-metal thicknesses of greater than 1.2 mm, there is the risk of the tab elements breaking during bending and the assemblies can no longer be fastened and positioned on the body shell.

The problem also exists in the case of heat-formed components, the tab elements of which are designed as unhardened regions.

The invention is therefore based on the object of providing a body component which has a pre-fastening device with tab elements which are subjected to a less severe load.

This and other objects are achieved according to the invention by a body component having a side edge which extends in a longitudinal direction and on which at least one pre-fastening device is formed. The pre-fastening device has a portion which protrudes in a transverse direction in relation to the side edge and on which a tab (tab element) pointing toward the side edge is formed. The tab is bendable in a vertical direction perpendicular to the longitudinal direction and is designed to be able to engage behind a frame edge of a vehicle frame part in a pre-fastening manner.

The effect achieved by the arrangement of the tab in the protruding portion and the rearwardly directed extent with respect to the side edge of the body component and also the frame edge of the vehicle frame part is that the necessary bending angle is significantly reduced. It already suffices to bend the tab only to the extent that said tab forms a stop upon a relative movement of the body component in relation to the vehicle frame part.

In an advantageous embodiment, it is provided that the tab is bent at least in sections in the vertical direction in relation to a plane parallel to a surface of the body component and of the protruding portion by an angle of 15-40°, preferably 15-30°. The angled design allows the tab to converge obliquely in the direction of the side edges of the body component and vehicle frame part, wherein the tab comes into contact with the frame edge of the vehicle frame part upon a relative movement of the two components and prevents a relative further movement. Accordingly, the small bend in only one direction suffices in order to ensure engagement behind during the relative movement and to form the stop.

In an advantageous embodiment of the invention, the protruding portion is annular and has an opening into which the tab projects. The tab is preferably formed integrally on the annular protruding portion. The protruding portion is also preferably formed integrally on the body component.

In order to ensure sufficient stability, it is provided, in one embodiment, that the tab has, in the transverse direction, a width which corresponds to 20-70% of a width of the protruding portion in the transverse direction.

The tab thickness in the vertical direction is preferably greater than or equal to 1.2 mm.

With regard to the shape of the tab, it is furthermore favorable to design the free end thereof to be rounded. The free end is directed in the direction of the side edge of the body component and vehicle frame part. Upon a relative movement, the tab and the components come into contact. A rounded shape is therefore preferred.

Furthermore, it is provided, in a variant embodiment, that a distance in the transverse direction between the side edge and the free end of the tab is at least 2 mm. This distance permits positioning of the body component and vehicle frame part without continuous pre-fastening. On the contrary, the tab only reaches behind the frame edge of the vehicle frame part when the components move relative to one another, for example during transport to the welding station. For the otherwise loose pre-fastening, play of the components with respect to one another is ensured.

It is also advantageous if the tab is formed from the same material as the body component. Since preferably hot- or cold-formed steels are used for the body component, the tab obtains a sufficient strength.

The invention also includes a method for the movable pre-fastening of the above-described body component to the vehicle frame part, wherein the body component is placed onto the vehicle frame part such that the side edge of the body component runs parallel to the frame edge and the protruding portion is spaced apart from the frame edge in the transverse direction, wherein the tab points in the direction of the frame edge and is bent at least in sections in the vertical direction in relation to a plane parallel to a surface of the body component and of the protruding portion by an angle of 15-40°. Therefore, the tab engages behind the frame edge upon a relative movement between the body component and the vehicle frame in the transverse direction.

It is furthermore preferably provided in the case of the method that, when the body component is placed onto the vehicle frame, the free end of the tab is spaced apart from the vehicle frame. This distance permits the above-described placing on of the body component and vehicle frame part without continuous pre-fastening, and engagement of the tab behind the side edge of the vehicle frame part only in the case when the components move relative to one another.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a perspective view of a pre-fastening device on a body component.

DETAILED DESCRIPTION OF THE DRAWING

FIG. 1 shows an exemplary embodiment of a pre-fastening device on a body component 1, wherein the body component 1 has been brought into contact with a vehicle frame part 6. The side edge 2 of the body part 1, said side edge extending in the longitudinal direction L, and the frame edge 5 of the vehicle frame part 6 run parallel and substantially flush.

Extending integrally on the body component 1 in the transverse direction Q is an annular portion 3 which protrudes over the side edge 2 and on which the tab 4 pointing toward the side edge 2 is formed. For this purpose, an opening 7 is provided in the protruding portion 3. In the embodiment shown, the tab 4 is bent in the vertical direction in relation to the plane parallel to the surface of the body component 1 and of the protruding portion 3 by an angle α of 30°. The bend is achieved, for example, by pneumatic punching tools or other bending apparatuses. In the exemplary embodiment shown, the tab 4 has a length of 10 mm in the transverse direction Q and a width of 5 mm in the longitudinal direction L. It has a thickness of 1.6 mm in the vertical direction. Its free end pointing toward the side edge 2 is rounded.

In the transverse direction Q, a distance is provided between the side edge 2 of the body component and the free end of the tab 4. The pre-fastening device therefore does not fasten in a locking manner in this state, but rather provides the possibility of the tab 4 engaging behind the frame edge 5 upon a relative movement of the body component 1 in the transverse direction in relation to the vehicle frame part 6.

Corresponding protruding portions 3 with tabs 4 repeatedly spaced apart in the longitudinal direction are arranged on the body component 1 in order to distribute the load between a plurality of tabs 4. In addition, corresponding pre-fastening devices can also be provided along an edge running perpendicularly to the side edge 2.

The invention is not restricted in its implementation to the preferred exemplary embodiments indicated above. On the contrary, a number of variants also making use of the solution illustrated in embodiments of a fundamentally different type are conceivable. For example, a plurality of tabs can also be arranged next to one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A body component, comprising:
a side edge which extends in a longitudinal direction;
at least one pre-fastening device formed on the side edge, wherein
the pre-fastening device has a portion which protrudes in a transverse direction in relation to the side edge and on which a tab pointing toward the side edge is formed, and
the tab is bendable in a vertical direction perpendicular to the longitudinal direction and is configured in order to be able to engage behind a frame edge of a vehicle frame part in a pre-fastening manner.

2. The body component as claimed in claim 1, wherein the tab is bent at least in sections in the vertical direction in relation to a plane parallel to a surface of the body component and of the protruding portion by an angle of 15-40°.

3. The body component as claimed in claim 2, wherein the protruding portion has an opening into which the tab projects.

4. The body component as claimed in claim 1, wherein the protruding portion has an opening into which the tab projects.

5. The body component as claimed in claim 1, wherein the tab has, in the transverse direction, a width which corresponds to 20-70% of a width of the protruding portion in the transverse direction.

6. The body component as claimed in claim 3, wherein the tab has, in the transverse direction, a width which corresponds to 20-70% of a width of the protruding portion in the transverse direction.

7. The body component as claimed in claim 6, wherein the protruding portion and the tab are formed integrally on the body component.

8. The body component as claimed in claim 1, wherein the protruding portion and the tab are formed integrally on the body component.

9. The body component as claimed in claim 8, wherein a free end of the tab is rounded.

10. The body component as claimed in claim 1, wherein a free end of the tab is rounded.

11. The body component as claimed in claim 10, wherein a distance in the transverse direction between the side edge and a free end of the tab is at least 2 mm.

12. The body component as claimed in claim 1, wherein a distance in the transverse direction between the side edge and a free end of the tab is at least 2 mm.

13. The body component as claimed in claim 12, wherein the tab is formed from the same material as the body component.

14. The body component as claimed in claim 1, wherein the tab is formed from the same material as the body component.

* * * * *